United States Patent [19]

Harbold

[11] Patent Number: 4,943,079
[45] Date of Patent: Jul. 24, 1990

[54] TEMPORARY TRAILER BRAKE RELEASE SYSTEM

[75] Inventor: Jay R. Harbold, York Springs, Pa.

[73] Assignee: Harbold's Auto & Truck Inc., Camp Hill, Pa.

[21] Appl. No.: 379,875

[22] Filed: Jul. 14, 1989

[51] Int. Cl.⁵ .................. B60D 1/62; B62D 53/08
[52] U.S. Cl. .................... 280/420; 280/427; 280/477
[58] Field of Search ............ 280/420, 421, 427, 428, 280/477

[56] References Cited

U.S. PATENT DOCUMENTS

| | | | |
|---|---|---|---|
| 3,169,012 | 2/1965 | Fagan | 254/86 |
| 3,181,887 | 5/1965 | Boylan et al. | 280/421 |
| 3,570,063 | 3/1971 | Garnett | 280/428 X |
| 4,383,696 | 5/1983 | Picard | 280/81 R |

FOREIGN PATENT DOCUMENTS 0145012 11/1980 Japan .................... 280/420

*Primary Examiner*—Charles A. Marmor
*Assistant Examiner*—Mitchell Bompey
*Attorney, Agent, or Firm*—Robert F. Palermo

[57] ABSTRACT

A system for temporarily releasing spring actuated emergency brakes on semi-trailers without the necessity for the operator to leave the cab of the tractor for movement within marshalling yards comprises an air receiving valve centrally positioned at the front of the trailer a specific distance from the kingpin and connected to the emergency air system through a valve which seals the gladhand when the system is in use, an air injection probe extendibly mounted on a trolley which travels on an arcuate track mounted below and ahead of the fifth wheel of the tractor such that the probe travels in an arc at a distance from the center of the fifth wheel equal to that between the receiving valve and the king pin, a sensing switch for sensing alignment of the injector probe with the receiving valve, a drive mechanism for moving the trolley to align the injector probe and receiving valve, an air actuated cylinder for extending and retracting the injector probe to make and break contact with the receiving valve, a solenoid valve and a cab mounted switch for controlling pressurization of the injector probe, an air control valve in the cab for actuating the air cylinder and for pressurizing the injector probe, and a switch in the cab for controlling trolley movement.

9 Claims, 5 Drawing Sheets

TEMPORARY TRAILER BRAKE RELEASE SYSTEM

FIELD OF THE INVENTION

This invention is generally directed toward a quick and convenient means for pressurizing a semi-trailer air system in order to release the spring actuated emergency brakes and thereby permit movement of the trailer between its parking place and the loading dock in a freight terminal yard.

BACKGROUND OF THE INVENTION

Semi-trailers have braking systems which are controlled through air system connections with the prime mover or tractor. The braking systems consist of service brakes, controlled from the brake pedal of the tractor, and emergency brakes which are operated either by air, actuated by a trailer brake lever in the tractor, or by spring loaded brake chambers which apply the brakes when air pressure is lost.

Each semi-trailer has two air lines, one each for service and emergency brakes, which must be connected to hoses on the tractor in order to receive a supply of compressed air. These air lines are terminated by rigidly mounted "glad hands" which are quick connectors at the front of the trailer and which receive the tractor air supply through rotatable "glad hands" at the ends of the tractor air hoses.

Whenever the trailer air system is unpressurized, the spring loaded brake chambers apply the brakes and thus prevent movement of the trailer. In order to release these spring actuated brakes, an air supply of sufficient pressure must be provided to override the spring force.

At truck freight terminals and marshalling yards there are many dozens of trailers awaiting handling and positioning. Relatively few can be handled at one time. The remainder are parked about the terminal until they can be handled by the loading crews. The movement of the trailers within the terminal or marshalling yard is generally accomplished by "yard jockeys" —small tractors which are dedicated to trailer movement, within the yard between the loading and parking areas.

Each time the "yard jockey" operator backs up to a trailer and engages the trailer king pin, he must exit the cab, connect the air hoses, re-enter the cab, and then release the trailer brakes before proceeding to move the trailer. This procedure is time consuming, inconvenient, and, during inclement weather, may be dangerous to the operator The object of this invention is to provide a means whereby a "yard jockey" operator can engage the trailer king pin, establish his air connection, and release the trailer brakes quickly and easily without leaving the comfort and safety of his cab.

BRIEF DESCRIPTION OF THE DRAWINGS

The said object and the means for accomplishing same will be more readily understood by reference to the drawing figures, in which.

DETAILED DESCRIPTION OF THE DRAWINGS

Figure 1:
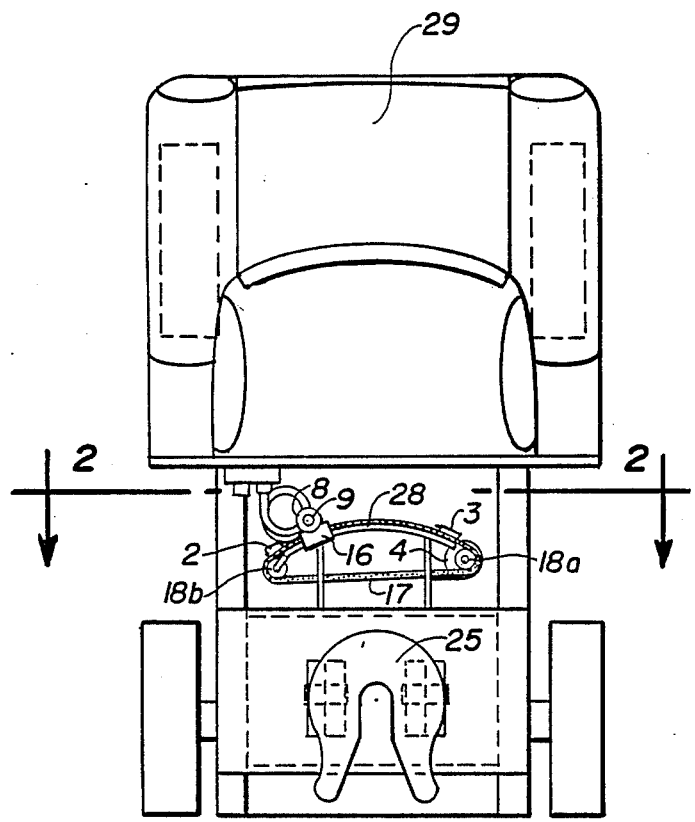
FIG. 1 is a plan view from above showing the "yard jockey" tractor, the front portion of the semi-trailer, the general layout of the various components of the tractor-trailer hitch mechanism, and some elements of the invention.
Figure 1:
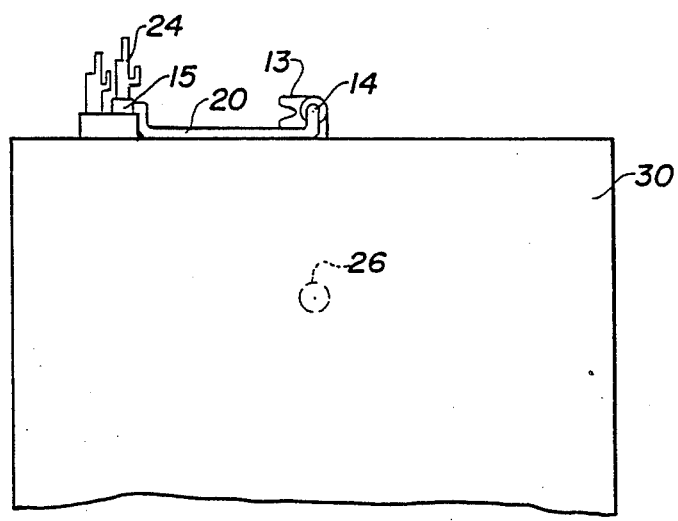

Referring to FIG. 1, the "yard jockey", or tractor 29, is seen aligned with the trailer 30. In this position, the fifth wheel 25 of the tractor 29 is aligned with the king pin 26 of the trailer 30 so that, when the tractor 29 backs against the trailer 30, the king pin 26 will be locked into the fifth wheel 25. The rigidly mounted trailer emergency air "glad hand" 24 is connected by hose 20 to air receiving valve 14. Interposed between "glad hand" 24 and hose 20 is an "or" valve 15 which allows air to enter from "glad hand" 24 or from hose 20. There is an orificed hinged stopper which closes one port when air is entering through the other, and vice versa.

Still referring to FIG. 1, a positioning stop 13 is seen attached to air receiving valve 14. On the "yard jockey", mounted ahead of the fifth wheel 25, is shown the tractor portion of the invention mechanism generally depicting the trolley 16, the drive chain 17, sprockets 18, the air injector probe 9, the air actuated cylinder 8, the electric drive motor 4, and the trolley travel limit switches 2 and 3. The trolley 16 rides on an arcuate plate 28 which defines an arc of 35 degrees (17 ½ degrees to each side of the tractor centerline). It is so positioned that the distance between the center of the air injector probe 9 and the center point of the fifth wheel 25 is 44 inches. This placement corresponds to the center distance between the king pin 26 and the air receiving valve 14 on the trailer 30.

Figure 2:
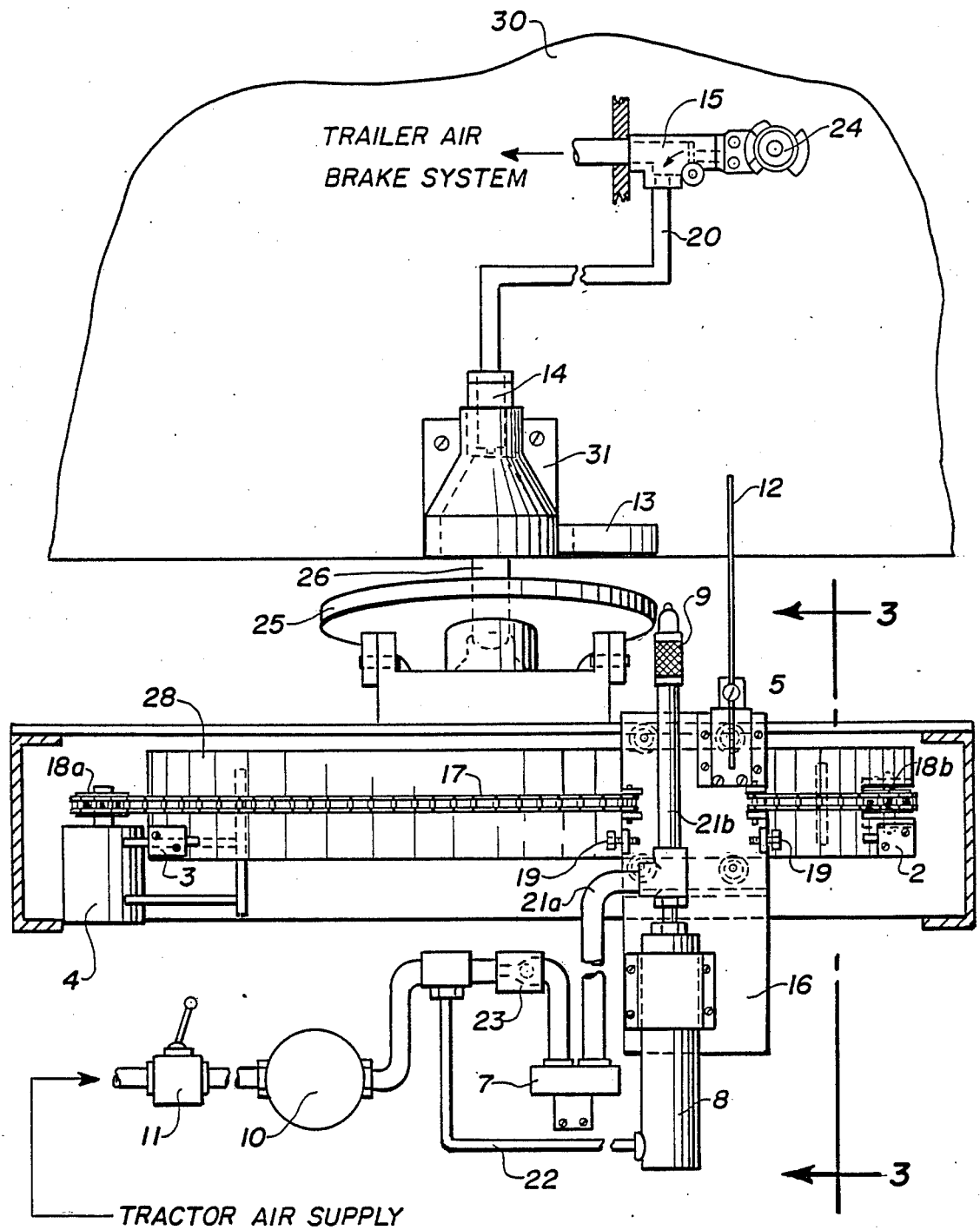
FIG. 2 is a rearward view, from line 2—2 in FIG. 1, showing the invention details and the schematic relationship with the tractor and trailer air systems.

Referring now to FIG. 2, which is a rearward sectional view from line 2—2 of FIG. 1, greater detail of the invention can be seen. Looking first at the trailer 30, the emergency air system glad hand 24 and the "or" valve 15 are shown out of position so that greater detail of the "or" valve 15 can be seen. These components are rigidly mounted to the front of the trailer 30 and project forward toward the tractor 29. The air receiving valve 14 is mounted 6 inches above the trailer bottom with its funnel shaped opening projecting downward from the valve and is rigidly clamped to a stand-off bracket 31 which is of an appropriate size to establish the 44 inch center distance between the air receiving valve 14 and the king pin 26. The air injector probe 9 is mounted on a length of hose 21b which is approximately 6 inches long so that the air injector probe 9 can move slightly to accomodate slight misalignment with the air receiving valve 14. This short length of hose is very stiff and presents no danger of buckling. In its retracted position the top of air injector valve 9 is approximately 1 inch below the top of the fifth wheel 25 when it is engaged with king pin 26. The positioning stop 13 is also shown mounted on the funnel below air receiving valve 14.

When it is not in use, the trolley 16 is "parked" against limit switch 2 on the left side of the tractor. After backing in and engaging the fifth wheel 25 with king pin 26, the operator operates an electrical switch in the cab to actuate the d.c. drive motor 4 to turn the drive sprocket 18a attached to the motor shaft thereby moving drive chain 17 around idler sprocket 18b and causing trolley 16 to move rightward along its arcuate plate 28 until the position sensor wand 12 contacts positioning stop 13. When this happens, the funnel sensor switch 5 opens and deactivates drive motor 4 and turns off the panel indicator light 6 in the cab. Because of the offset between the funnel sensor switch 5 and the air injector probe 9, which offset is the same as that between the air receiving valve 14 and positioning stop 13, the air injector probe 9 is directly below the air receiving valve 14.

When the panel indicator light 6 is extinguished, the operator can immediately operate the tractor air valve 11 which causes air cylinder 8 to extend up to 8 inches, causing the air injector probe 9 to move upward into the air receiving valve 14, and to thereby pressurize the trailer emergency air system. Extension of the air cylinder 8 is caused by bleed off pressure through hose 22 which forces air injector probe 9 into air receiving valve 14 while operating air through check valve 23 and solenoid valve 7 passes through hose 21a and 21b to pressurize the trailer emergency air system. This overcomes the spring brake pressure and releases the trailer emergency brakes so it can be moved.

Also shown in FIG. 2 is limit switch 3 which is provided in case the trailer is not equipped with an air receiving valve 14 and the trolley travels to the right hand limit without contacting the positioning stop 13. In this case, the operator will have to manually connect the tractor emergency air hose with the trailer emergency air system glad hand 24 and ignore the automatic features of this invention.

After the trailer emergency system is pressurized and the spring brakes are released, the operator again actuates valve 11. This causes quick release valve 10 to vent the air from the tractor portion of the invention depressurizing hose 22 and causing air cylinder 8 to retract and air injector probe 9 to withdraw from air receiving valve 14. Upon withdrawal of probe 9, valve 14 closes and maintains pressure in the trailer emergency system. The operator can then move the trailer 30 within the yard.

Note that trolley 16 is equipped with two adjustable limit stops 19 which contact limit switches 2 and 3. This prevents binding of the trolley drive mechanism at its extremes.

Figure 3:
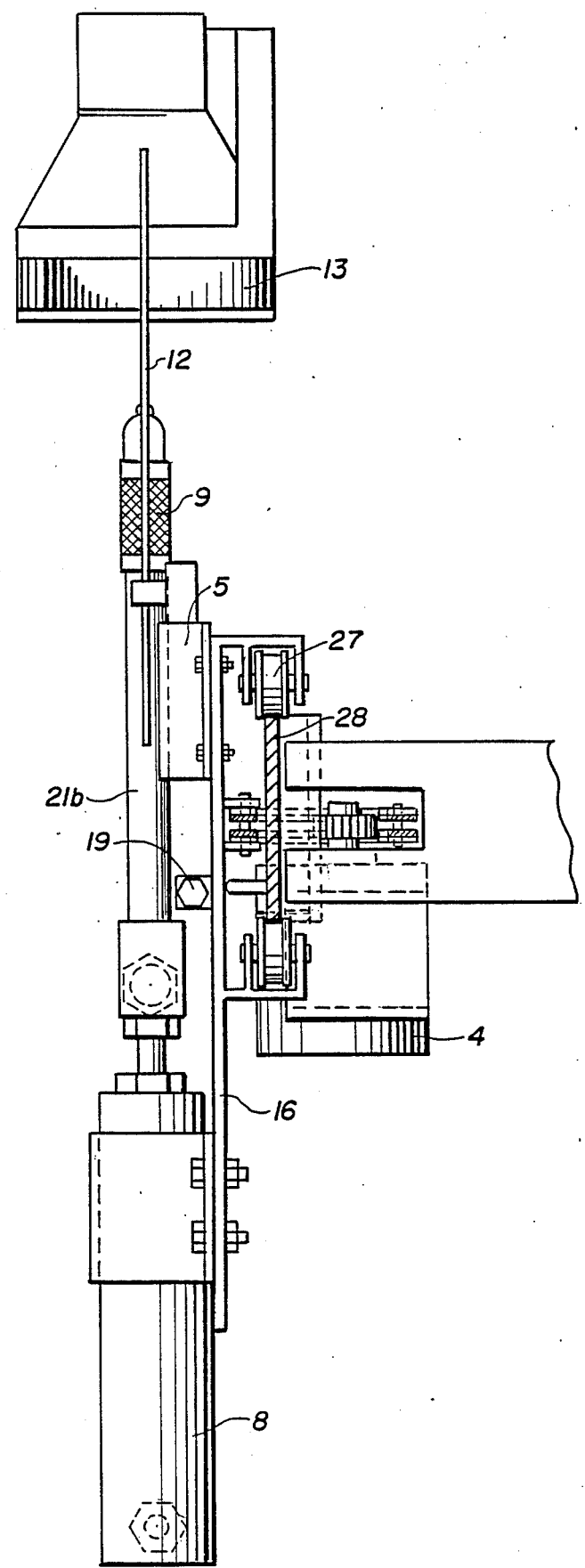
FIG. 3 is a sideward sectional view from line 3—3 of FIG. 2 showing some additional detail of the invention.

FIG. 3 presents a sideward view from line 3—3 in FIG. 2. In this view are seen additional details of positioning stop 13, position sensor wand 12, funnel sensor switch 5, air injector probe 9, air cylinder 8, trolley 16, and adjustable limit stops 19. Also seen are two of the four trolley wheels 27 riding on the arcuate plate 28 which forms the trolley track.

Figure 4:
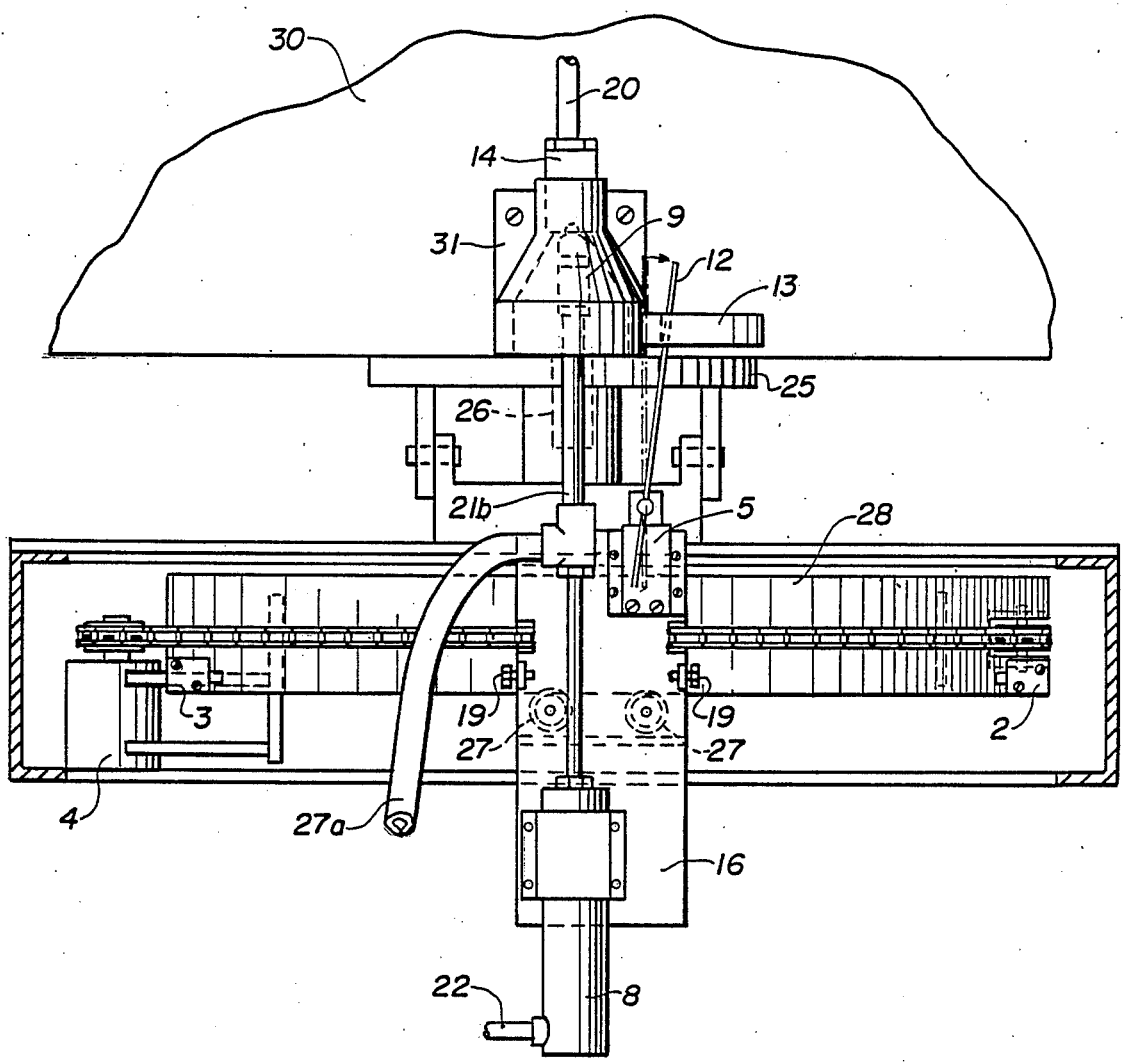
FIG. 4 is another rearward view as in FIG. 2, this time showing the invention mechanism on the tractor inserted into the invention mechanism on the trailer.

FIG. 4 is another rearward view, as in FIG. 2, showing trolley 16 this time centered on the track 28. The position sensor wand 12 is in contact with positioning stop 13 and is deflected sufficiently so that funnel sensor switch 5 is open and drive motor 4 is stopped. Air injector probe 9 is inserted in air receiving valve 14 due to the extension of air cylinder 8.

This is the configuration seen when the air injector probe 9 is being used either to pressurize the trailer emergency air system or to release air from the emergency air system when parked.

When pressurizing the system, the operator throws the tractor air valve 11 with solenoid valve 7 in the open position. This extends air cylinder 8 by feeding air through hose 22 while simultaneously providing air pressure through hoses 21a and 21b to the air injector probe 9 which injects air into air receiving valve 14 and pressurizes the trailer emergency air system through hose 20.

"Or" valve 15 is designed so that it will slowly leak and depressurize the trailer emergency air system through glad hand 24 and permit the spring actuated brakes to be reapplied in approximately 15 to 20 minutes. This allows sufficient time for normal movement of the trailer 30 within the marshalling yard. This leakage does not occur during normal operation because air receiving valve 14 does not leak.

If the trailer 30 is parked while the air system is still fully pressurized, the operator can depressurize the trailer air system by closing solenoid valve 7 by means of switch 32 (in FIG. 5) and opening tractor air valve 11. This causes air cylinder 8 to extend, but, since solenoid valve 7 is closed, there is no air supply to the air injector probe 9. When the unpressurized probe 9 is inserted in valve 14 it permits a small amount of air to escape. This pressure perturbation triggers the quick release valve in the trailer brake system to fully depressurize the system and allow reapplication of the spring actuated brakes.

Figure 5:
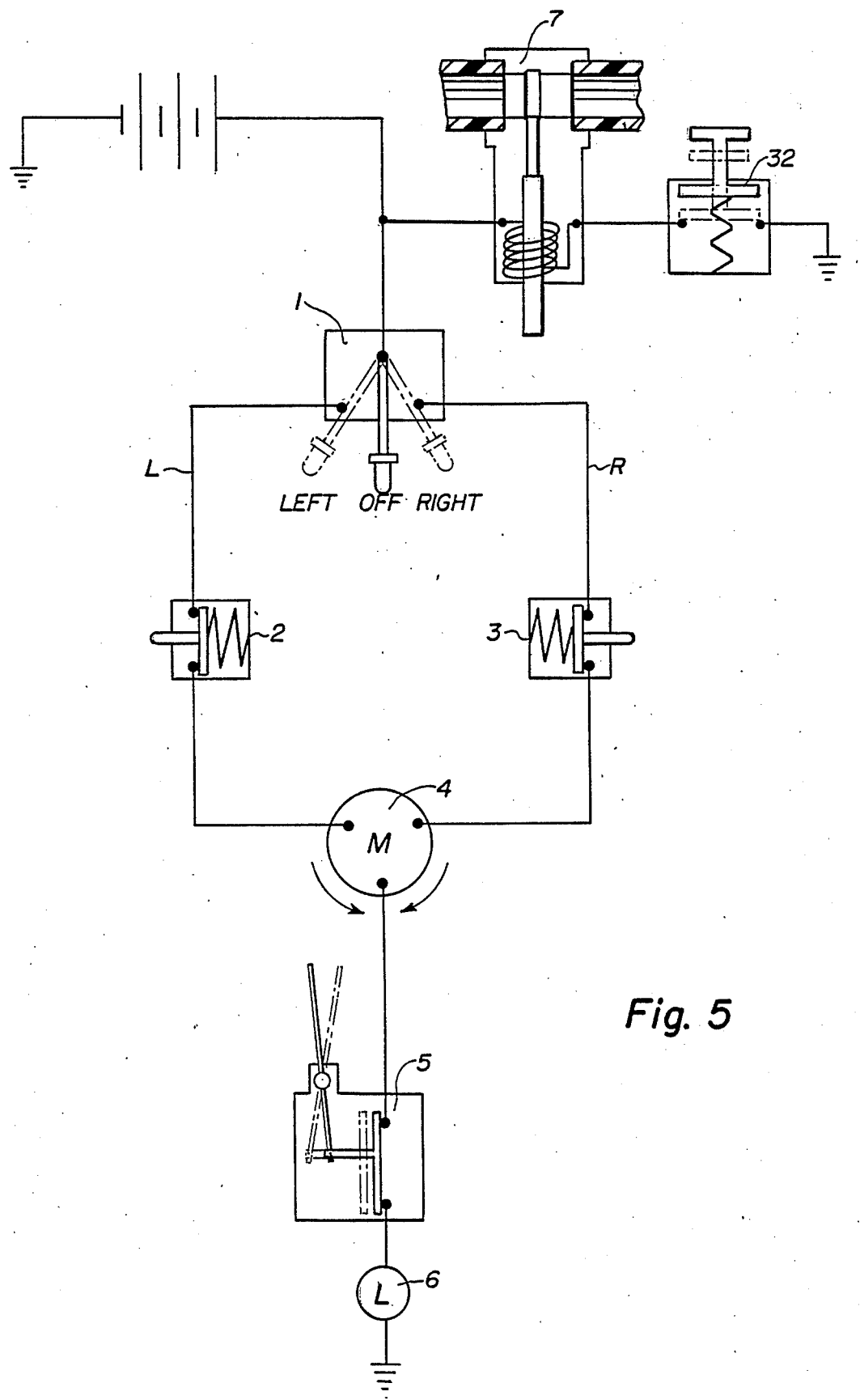
FIG. 5 is an electrical schematic of the invention control system.

FIG. 5 is a schematic diagram of the electrical system of the invention. The battery provides power to the trolley positioning motor 4 through main positioning switch 1. Switch 1 is a double throw switch which is off in its centered position and momentarily on in its left and right positions. Limit switches 2 and 3 are normally closed but they open to interrupt power to motor 4 when the trolley reaches either extreme position. Current is carried through wires "L" for leftward drive and "R" for rightward drive. Normally closed, funnel sensor switch 5 is between motor 4 and ground. This permits operation of motor 4 to drive the trolley until the position sensor wand is deflected, causing the switch 5 to open and interrupt power to the motor. Thus, the motor 4 will run in response to the operation of switch 1 when the trolley 16 is in any position except the centered travel position. When the centered position is reached by a rightward motion of the trolley 16, further motion is disabled and the trolley 16 stops. No further trolley 16 motion is possible in response to switch 1 until the tractor 29 disconnects from trailer 30, or until the tractor is misaligned sufficiently to permit reclosing of funnel sensor switch 5.

Indicator light 6 is mounted on the instrument panel. Whenever switch 1 is thrown and the motor 4 is operating light 6 is illuminated. When the drive is deactivated by limit switches 2 or 3 or by funnel sensor switch 5, the light 6 is extinguished. The operator then knows that the trolley is in one of those three positions, depending upon the direction in which he has operated switch 1.

Also shown in FIG. 5 is switch 32 which operates the solenoid air valve 7. This enables the operator to extend air cylinder 8 without pressurizing the air injector 9 when he wants to depressurize the trailer emergency air system and lock the trailer brakes by pressing switch 32 to close solenoid valve 7 and operating valve 11.

An air gauge may be provided in the tractor to permit the operator to determine the air pressure injected into the trailer emergency air system which requires a minimum of 60 psi to release the spring brakes.

Considering the foregoing description of my invention, it is obvious that various modifications may be made in system components and in the arrangement thereof. For instance, the drive mechanism for the trolley could consist of a rack and pinion system, an air cylinder drive, a hydraulic cylinder drive, a belt drive system, or a screw drive system instead of the chain drive disclosed. Also, the electric drive motor could be replaced with an air or hydraulically driven motor. These and other changes as may become obvious to those skilled in the art can be made without functionally departing from my invention as disclosed.

I have described my invention in its preferred embodiment together with several possible modifications. I do not intend to limit my invention to the exact design as shown. Accordingly, all suitable modifications and equivalents as may be resorted to are considered as falling within the scope of my invention.

What I claim is:

1. A system for temporarily releasing a spring actuated emergency brakes which are controlled by an air system on a semi-trailer without the operator leaving a cab of a tractor for towing a semi trailer so that it can be moved about in a freight marshalling yard, comprising an air injector probe means on the tractor for supplying air to the semi-trailer emergency air system; a valve means on the semi trailer for receiving the injected air supply coupled with an "or" valve to close a glad hand when air is injected; location means on the semi trailer for establishing an exact spatial relationship between said valve and a semi trailer king pin; an arcuate track means for positioning the injector probe means at an exact distance from a center of a tractor fifth wheel, said distance being the same as that between the semi trailer king pin and the air receiving valve means on the semi trailer; a trolley means for carrying the injector probe along the arcuate track means to achieve correct alignment between the injector probe means and the trailer air receiving valve means a drive means for providing trolley means movement along the track means; sensing means for sensing trolley travel limits and alignment between the air injector probe means and the air receiving valve means switching means for controlling electrical and pneumatic circuits of the system; and air injector probe means extension and retraction means for establishing connection between the air injector probe means and the air receiving valve means.

2. A brake release system as in claim 1 wherein the spacing between the semi trailer king pin and the air receiving valve means on the semi trailer is 44 inches, which distance is the same as that between the center of the fifth wheel on the tractor and the air injector probe means.

3. A brake release system as in claim 1 wherein the drive means for the trolley means is selected from the group consisting of electric motors, air motors, and hydraulic motors.

4. A brake release system as in claim 1 wherein the drive means for the trolley means is selected from the group consisting of chain drives, belt drives, screw drives, rack and pinion drives, air cylinder drives, and hydraulic cylinder drives.

5. A brake release system as in claim 1 wherein the "or" valve stopper has an orifice which permits a slow leakage through the glad hand of pressure from the semi trailer emergency air system so that the spring actuated brakes will be reapplied in 15 to 20 minutes.

6. A brake release system as in claim 1 wherein the arcuate track means subtends a horizontal angle of 35 degrees centered about a centerline of the tractor.

7. A brake release system as in claim 1 wherein the means for sensing alignment between the air injector probe means and the air receiving valve means comprises an electrical switch, with a rigid wand, which is toggled to open when alignment occurs to extinguish an indicator light in the tractor and to interrupt power to the trolley drive means.

8. A brake release system as in claim 1 wherein the air injector probe extension and retraction means comprise an air actuated cylinder.

9. A brake release system as in claim 1 wherein the means for sensing trolley travel limits comprise limit switches which open to interrupt power to the drive means and to extinguish an indicator light in the tractor.

* * * * *